United States Patent [19]

van den Wildenberg

[11] Patent Number: 4,917,008
[45] Date of Patent: Apr. 17, 1990

[54] BALING MATERIAL AND BALING DEVICE FOR MAKING BALED ARTICLES

[75] Inventor: Leonardus J. van den Wildenberg, Budel, Netherlands

[73] Assignee: P.J. Zweegers en Zonen Landbouwmachinefabriek B.V., Netherlands

[21] Appl. No.: 223,444

[22] Filed: Jul. 25, 1988

[30] Foreign Application Priority Data

Aug. 21, 1987 [NL] Netherlands .................. 8701973

[51] Int. Cl.⁴ .................. B65B 63/04; B65B 13/02; B65D 71/00
[52] U.S. Cl. .................. 100/5; 53/118; 53/211; 53/556; 53/587; 56/341; 100/15; 100/76; 100/88; 206/83.5; 206/410
[58] Field of Search .................. 100/5, 8, 15, 76, 88, 100/89, 87; 53/118, 389, 430, 461–465, 587, 556, 441, 528, 211; 56/341, 343, DIG. 2; 206/83.5, 410, 413–416, 442, 389; 428/255, 230, 231, 192, 43

[56] References Cited

U.S. PATENT DOCUMENTS

| 3,895,711 | 7/1975 | Hiltunen et al. | 206/413 |
| 4,144,696 | 3/1979 | Gustavsson | 53/587 X |
| 4,173,112 | 11/1979 | Meiners | 56/341 |
| 4,248,343 | 2/1981 | Schaefer | 206/83.5 |
| 4,569,439 | 2/1986 | Freye et al. | 206/83.5 |
| 4,570,789 | 2/1986 | Fritz et al. | 206/83.5 |
| 4,598,528 | 7/1986 | McFarland et al. | 53/430 |
| 4,641,484 | 2/1987 | Popelka | 53/211 X |
| 4,703,605 | 11/1987 | Ackermann | 53/587 X |
| 4,784,886 | 11/1988 | Monget et al. | 428/230 X |

FOREIGN PATENT DOCUMENTS

| 1116134 | 1/1982 | Canada | 206/83.5 |
| 12684 | 6/1980 | European Pat. Off. | 56/341 |
| 126278 | 11/1984 | European Pat. Off. | |
| 105039 | 7/1985 | European Pat. Off. | |
| 2911441 | 9/1980 | Fed. Rep. of Germany | 100/5 |
| 3301420 | 7/1984 | Fed. Rep. of Germany | 100/5 |
| 2530406 | 1/1984 | France | |
| 2553695 | 4/1985 | France | |

Primary Examiner—Harvey C. Hornsby
Assistant Examiner—Stephen F. Gerrity
Attorney, Agent, or Firm—Watson, Cole, Grindle & Watson

[57] ABSTRACT

An elongated strip of baling material has opposite longitudinal edges, each of which includes an elastic element extending in the longitudinal direction of the strip. The width of the strip is greater than the length of the bale so that when the strip is wrapped around a bale, the opposite longitudinal edges of the strip extend radially inwardly to cover the outer peripheral portions of each of the end faces of the bale. The strip is held in place by the elastic elements in the longitudinal edges of the strip to protect the peripheral portions of the end faces of the bale.

12 Claims, 2 Drawing Sheets

BALING MATERIAL AND BALING DEVICE FOR MAKING BALED ARTICLES

BACKGROUND OF THE INVENTION

The invention relates to netting material and a baling device for making baled articles.

Known is a baler of the kind, which is used for the formation of bales of straw or hay.

In practice it has proved that when the netting has been wound roughly three times around the formed bale, the cooperation between the netting material and the more or less elastic baled material results in the bale having sufficient cohesion.

Nonetheless, the known baler and the netting material used thereby have several disadvantages.

The completed bale bound in netting is vulnerable at the end faces, particularly at their edges, with the result that there is a tendency for the bale to disintegrate after formation. Moreover, during the binding of the bale, the actual bale-forming operation of the baler is interrupted. The formation of a new bale can only be commenced after the previously formed bale has been enwrapped and ejected.

SUMMARY OF THE INVENTION

The invention has for its aim to counter these disadvantages by providing an improved netting material.

This is achieved by using a strip of netting material having edge zones which are elastic in the longitudinal direction of the strip. The width of the strip is greater than the length of the bale. When the baling device wrap is the material around the bale, edge zones of the net are wrapped around a part of the end face of the formed bale, and owing to its elasticity the net draws itself tight around the formed bale in such manner that it is sufficient to wind the netting for only a limited distance around the bale, without disintegration taking place.

The edge zones of the strip of material may include an elastic filament or closely spaced perforations to provide the desired elasticity. Since netting with a length of only 1½ times the circumference of the formed bale has to be wrapped around the bale, a considerable time saving is achieved. The bale formation process can take place in a more continuous manner than previously.

The measures according to the characteristic of the other claims can be applied either separately or in combination. The invention will be elucidated by reference to the accompanying drawings.

DETAILED DESCRIPTION OF THE INVENTION

Figure 1:
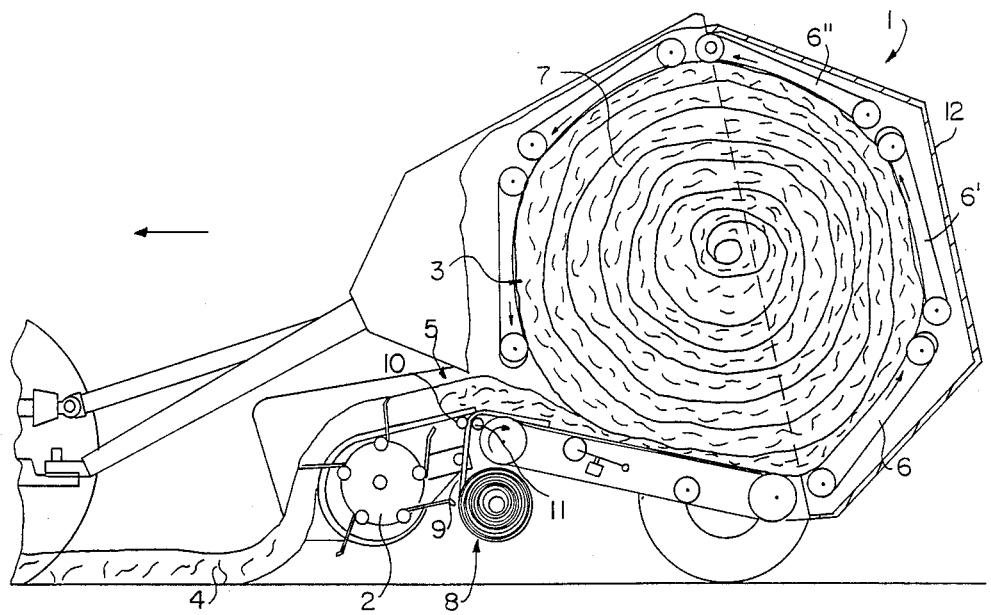
FIG. 1 shows a cross-sectional view of the baler according to the invention.
Figure 2:
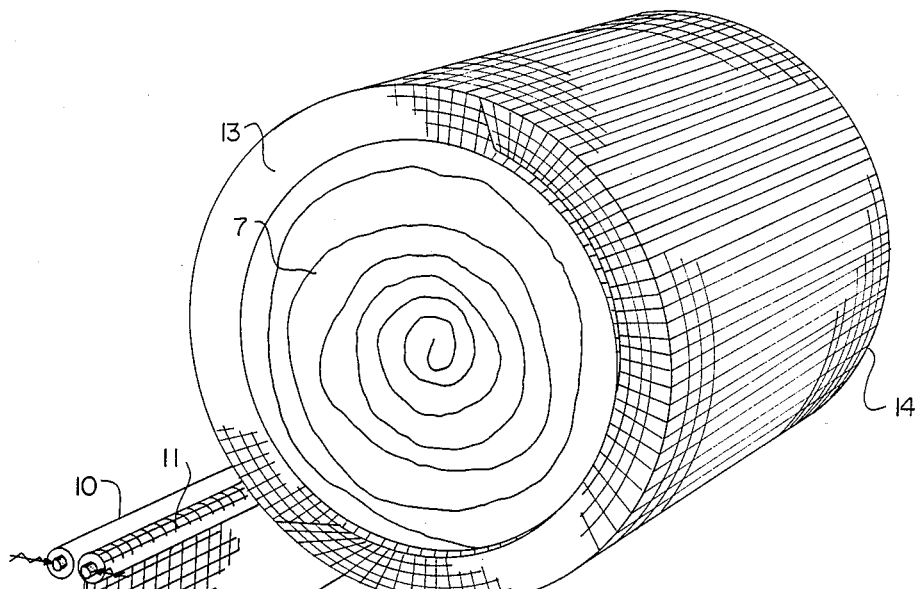
FIG. 2 shows a perspective view of a part of the apparatus of FIG. 1.

The baler 1 according to the invention has means in the form of a feeder roll 2 for the supplying to the forming mould 3 of a strip of the material 4 to be baled. The strip 4 passes through a supply opening 5 and then arrives in the roughly circular mould, along the wall of which driving means in the form of a succession of relatively short circulating belts 6, 6', 6" are disposed. Owing to these driving means 6, 6', 6" the material to be compressed is rotated and thereby formed into a bale, the radial edge zone of the bale thus acquiring a greater compactness than the core. Arranged on a supply roll 8 is netting material 9, which is to be wrapped around the formed bale 7. By means of cooperating transport rollers 10, 11, the netting 9 which is pinched between the transport rollers is fed to the forming mould 3 in order to be wound around the formed bale. When the netting has been wrapped roughly 1½ times around the formed bale, the portion concerned is separated by means of the blocking of the rollers 10, 11 and through the presence in the netting material of weakened zones at intervals of approximately 1½ times the circumference of the bale. Thereafter flap 12 is opened and the bale falls out of the baler.

According to the invention the breadth of the netting material transversely to the feeding direction is greater than the breadth of the forming mould 3 or where appropriate the bale 7 to be formed and moreover the netting material is elastic in the longitudinal direction, at least at its borders.

Figure 3:
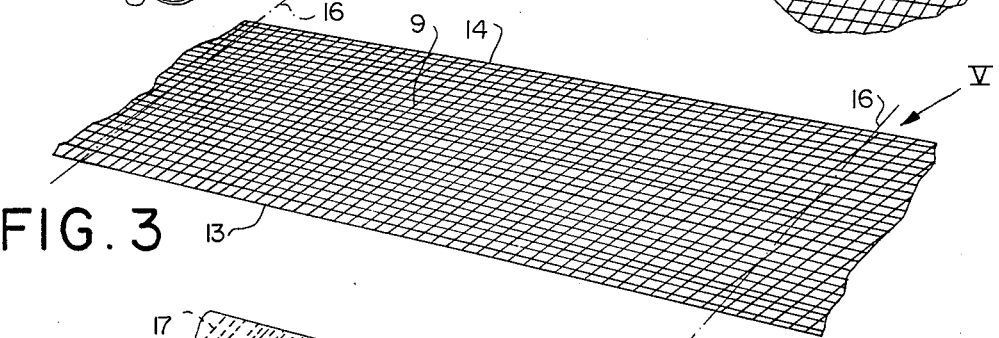
FIGS. 3 and 4 show examples of the netting material to be used.
Figure 4:
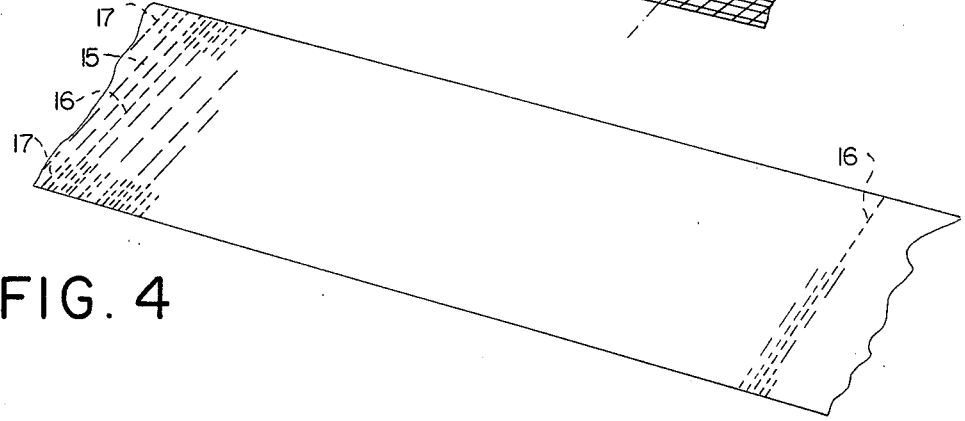

FIGS. 3 and 4 show embodiments of the netting material to be used. FIG. 3 shows a mesh-like material of which the borders in a longitudinal direction include elastic filament 13, 14.

Figure 5:
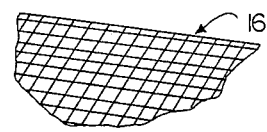
FIG. 5 shows a detail of netting material to be used.

FIG. 4 shows a foil material with passage openings 15. In the edge zones there are present perforations 17, which are more closely spaced than the openings 15, such that the edge zones are flexible in comparison to the zones with openings 15. FIG. 5 shows a weakened zone 16 in the netting material according to FIG. 3, for the purpose of ensuring that the netting will break on the exertion of a tensile force at that position.

This weakening may be made by local heating of the netting material either during manufacture or during use in the baler.

I claim:

1. Baling material for use in baling a bale of crop material of generally cylindrical form defining opposite end faces, said baling material comprising an elongated strip of material having a length and a longitudinal direction extending along said length, said strip having opposite longitudinal edge portions, said edge portions being elastic in the longitudinal direction so that when the baling material is wrapped around a bale, the opposite edge portions can cover portions of the end faces of an associated bale, each of said longitudinal edge portions including an elastic filament extending in the longitudinal direction of the strip.

2. Baling material as defined in claim 1 wherein the baling material is provided with weakened zones at intervals along the length thereof in the longitudinal direction.

3. Baling material for use in baling a bale of crop material of generally cylindrical form defining opposite end faces, said baling material comprising an elongated strip of material having a length and a longitudinal direction extending along said length, said strip having opposite longitudinal edge portions, said edge portions being elastic in the longitudinal direction of the strip so that when the baling material is wrapped around a bale, the opposite edge portions can cover portions of the end faces of an associated bale, the baling material comprising foil material, said edge portions having first perforations formed therein, said foil material having a central portion of foil material between said edge portions, said central portion having second perforations formed therein, said second perforations being more widely spaced than said first perforations.

4. Baling material as defined in claim 3 wherein each of said perforations comprises elongated perforations extending transversely to said longitudinal edge portions.

5. Baling material as defined in claim 3 wherein the baling material is provided with weakened zones at intervals along the length thereof in the longitudinal direction.

6. A baled article comprising a bale of crop material of generally cylindrical form having a circumference and having a predetermined length and opposite end faces having outer peripheral portions, baling material confining said bale and comprising a strip of material having a length and a longitudinal direction extending along the length of the strip, said strip having a width greater than the predetermined length of said bale, said strip of material having opposite longitudinal edge portions which are elastic in the longitudinal direction of the strip, said strip of material being wrapped around said bale with the opposite longitudinal edge portions thereof extending generally radially inwardly of the bale to cover at least the outer peripheral portions of each of said end faces, each of said longitudinal edge portions including an elastic element extending in the longitudinal direction of the strip of material.

7. A baled article comprising a bale of crop material of generally cylindrical form having a circumference and having a predetermined length and opposite end faces having outer peripheral portions, baling material confining said bale and comprising a strip of material having a length and a longitudinal direction extending along the length of the strip, said strip having a width greater than the predetermined length of said bale, said strip of material having opposite longitudinal edge portions which are elastic in the longitudinal direction, said strip of material being wrapped around said bale with the opposite longitudinal edge portions thereof extending generally radially inwardly of the bale to cover at least the outer peripheral portions of each of said end faces, the baling material comprising foil material, said edge portions having first perforations formed therein, said foil material having a central portion of foil material between said edge portions, said central portion having second perforations formed therein, said second perforations being more widely spaced than said first perforations.

8. A baled article as defined in claim 7 wherein each of said perforations comprises elongated perforations extending transversely to said longitudinal edge portions.

9. A baling device comprising a plurality of feed belts defining a generally cylindrical wrapping chamber, means for feeding a strip of crop material into said chamber to engage said feed belts, said feed belts being arranged to form said strip of crop into a generally cylindrical bale having a circumference and being of predetermined length and having opposite end faces including outer peripheral portions, a source of baling material comprising an elongated strip of baling material having a length and a longitudinal direction extending along the length of the strip, said strip having a width greater than said predetermined length of the bale, said strip having opposite longitudinal edge portions which are elastic in the longitudinal direction and each of which includes an elastic element extending in the longitudinal direction of the strip, and supply means for supplying said strip to said feed belts so that the strip is wrapped around said bale with the opposite longitudinal edges of the strip extending generally radially inwardly of the bale to cover at least the outer peripheral portions of each of the end faces of the bale.

10. A baling device as defined in claim 9 wherein said supply means is controlled to terminate supplying when a finite length of baling material has been fed to said feed belts so that such finite length of baling material is separated from the strip.

11. A baling device as defined in claim 10 wherein the finite lengths of baling material are joined along transverse weakening lines.

12. A baling device as defined in claim 9 wherein said supply means provides finite lengths of baling material which is wrapped around the bale so that each finite length when stretched over the circumference of the generally cylindrical bale is approximately $1\frac{1}{2}$ times said circumference.

* * * * *